Jan. 13, 1970 H. D. KELLEY 3,489,471
BEARING AND SEAL ARRANGEMENT FOR RIGID IDLERS
Filed April 17, 1968 3 Sheets-Sheet 1

INVENTOR
Hugh D. Kelley

BY Hovey, Schmidt, Johnson & Hovey
ATTORNEYS

Jan. 13, 1970  H. D. KELLEY  3,489,471

BEARING AND SEAL ARRANGEMENT FOR RIGID IDLERS

Filed April 17, 1968  3 Sheets-Sheet 2

INVENTOR
Hugh D. Kelley

BY
Hovey, Schmidt, Johnson & Hovey
ATTORNEYS

Jan. 13, 1970     H. D. KELLEY     3,489,471
BEARING AND SEAL ARRANGEMENT FOR RIGID IDLERS
Filed April 17, 1968     3 Sheets-Sheet 3
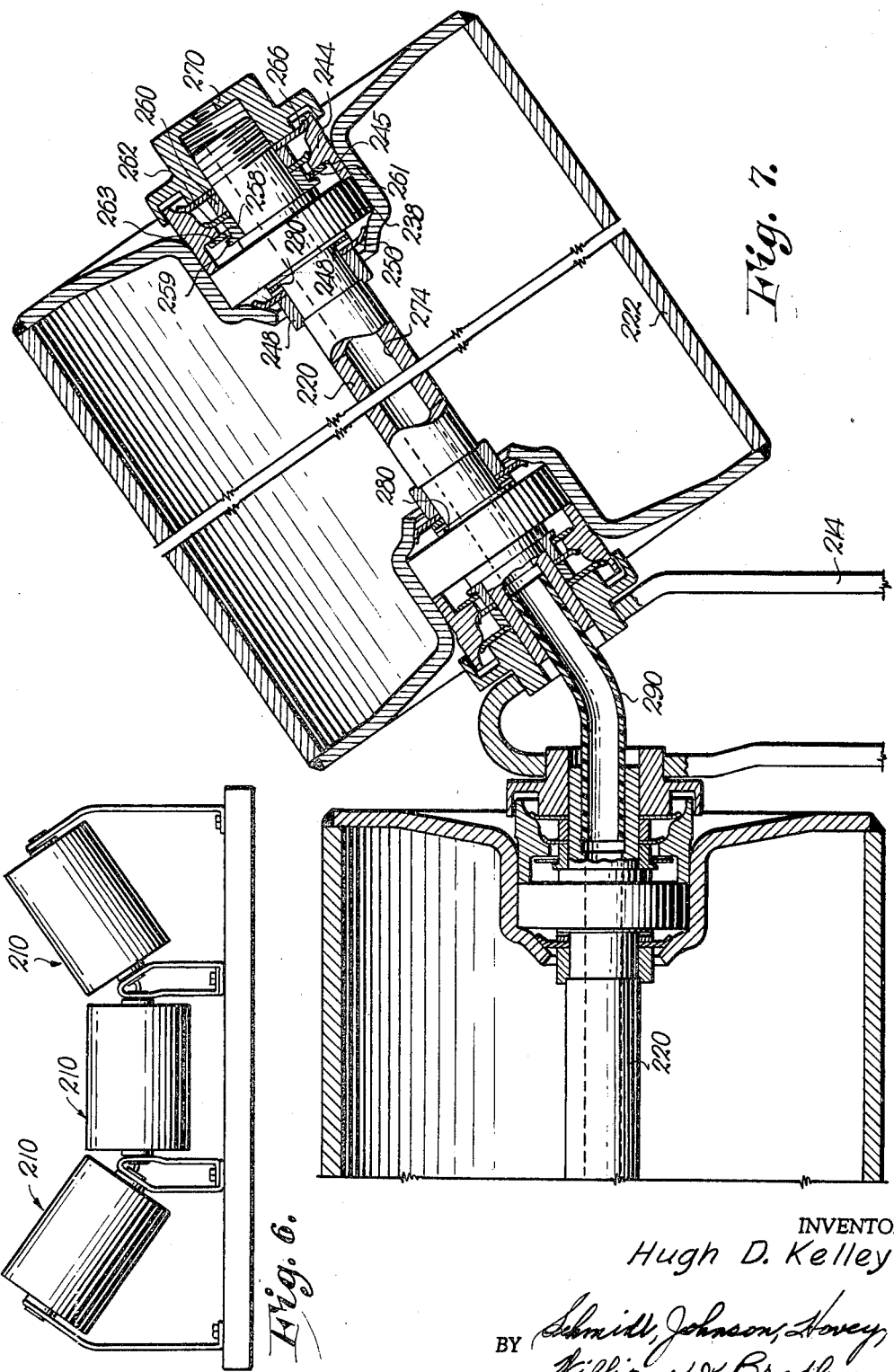
INVENTOR
Hugh D. Kelley
BY *Schmidt, Johnson, Hovey, Williams & Bradley*
ATTORNEYS United States Patent Office 3,489,471
Patented Jan. 13, 1970

3,489,471
BEARING AND SEAL ARRANGEMENT FOR
RIGID IDLERS
Hugh D. Kelley, 408 S. Bluff, Enterprise, Kans. 67441
Continuation-in-part of application Ser. No. 613,790,
Feb. 3, 1967. This application Apr. 17, 1968, Ser.
No. 722,529
Int. Cl. F16c 1/24, 33/78
U.S. Cl. 308—187                                    5 Claims

ABSTRACT OF THE DISCLOSURE

A rigid idler having a number of seals circumscribing the shaft thereof and in sealing relationship with a shell rotatably mounted on the bearing means of the shaft. The seals form a first reservoir for housing the bearing means, and an adjacent reservoir at the end of the shaft serving as a purging medium to prevent the entrance of particles into the bearing area. The seals are flexed toward the end of the shaft to promote outward flow of lubricant through the reservoirs. A floating washer and collar serves to permit lubricant to pass in one direction only through the reservoirs for purging the reservoirs.

---

This is a continuation-in-part of my copending application Ser. No. 613,790, filed Feb. 3, 1967, entitled "Bearing and Seal Arrangement for Rigid Idlers," now abandoned.

This invention relates to a rigid idler having novel sealing structure and has as its primary object the provision of a sealing arrangement designed to isolate the bearing means of the idler and direct the flow of lubricant in a manner to effectively preclude entrance of abrasive material into the bearing area.

It is another object of the instant invention to provide a rigid idler as above described wherein flinger means and locking structure are provided and arranged to throw outwardly any foreign material which tends to collect in the end of the idler. This feature may be particularly important when the roll is tipped and tends to funnel foreign material into the sealing portion of the roll, such as in a trough conveyor combination for handling bulk materials.

Another important object of the invention is to provide a novel floating washer and collar assembly interposed between the bearing and the outer seals to permit admission of lubricant directly into the bearing, yet which permits purging of the lubricant during operation of idler.

Still another object of this invention is the provision of easily installed flexible conduit means interconnecting the idler assemblies to permit lubrication of a plurality of the assemblies from a common point.

Figure 1:
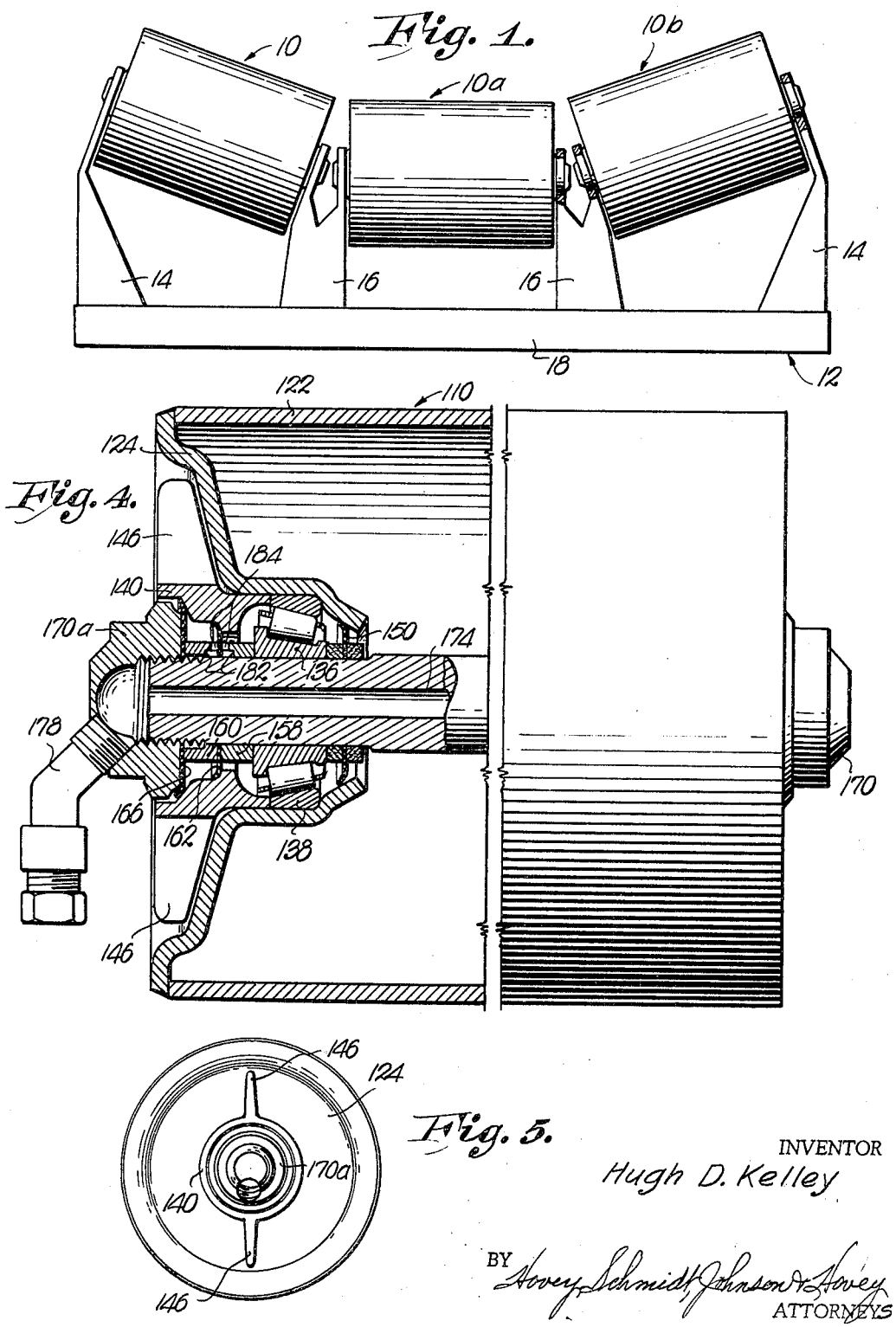
Figure 2:
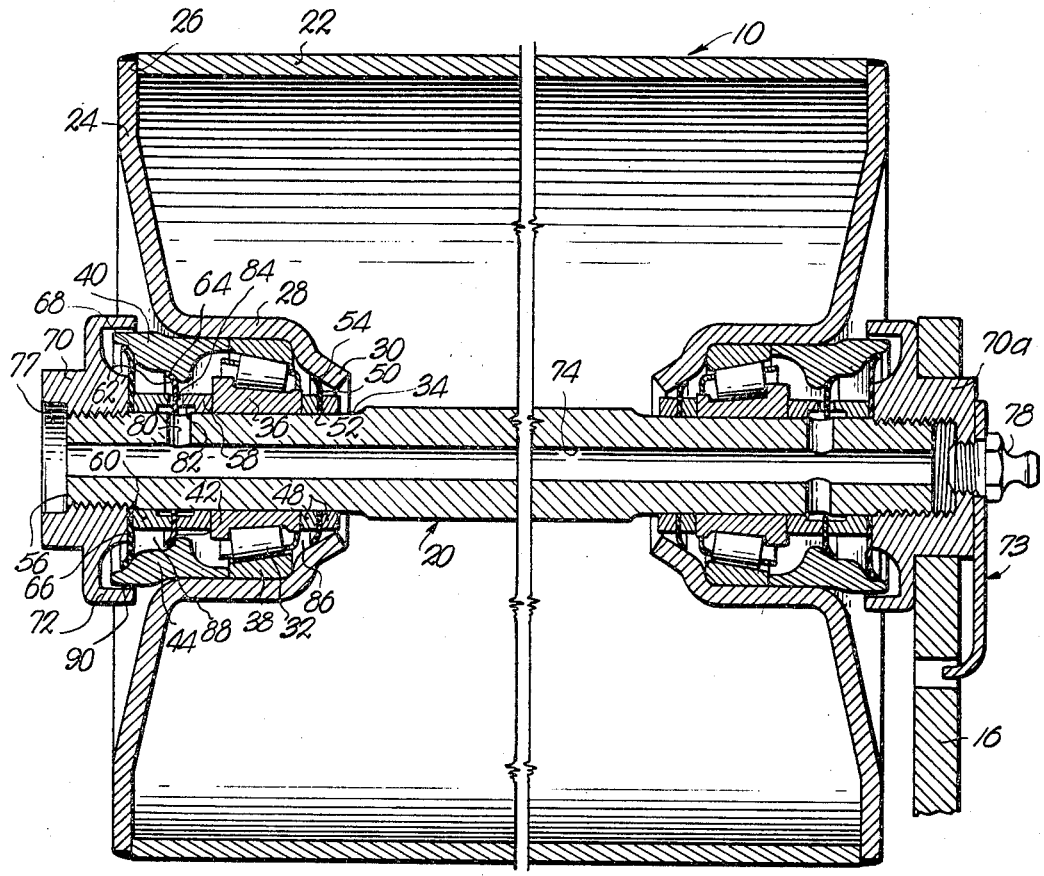
Figure 3:
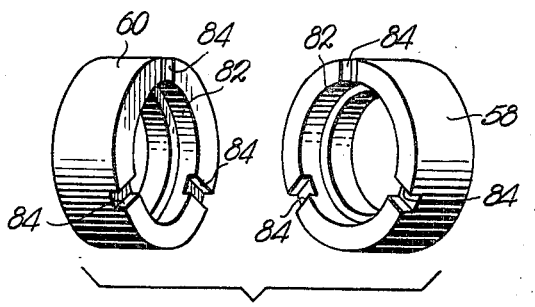

In the drawing:
FIG. 1 is a front elevational view of an idler assembly having three rolls provided thereon;
FIG. 2 is an enlarged, fragmentary, vertical cross-sectional view of one form of roll;
FIG. 3 is an enlarged, exploded, front perspective view of the seal retaining collars;
FIG. 4 is an enlarged, fragmentary, front elevational view of a modified form of roll, parts thereof being broken away and in section to reveal details of construction;
FIG. 5 is an end elevational view thereof;
FIG. 6 is a view similar to FIG. 1 but on a reduced scale, showing a modified form of idler assembly; and
FIG. 7 is an enlarged, fragmentary, vertical, cross-sectional view through the assembly of FIG. 6.

A form of idle roll of the invention, broadly designated by the numeral 10, is normally mounted in combination with similar rolls 10a and 10b on a supporting stand 12. A pair of end standards 14 and a pair of central standards 16 are secured to base 18 of stand 12 and are provided with suitable structure for rigidly securing the shaft 20 of each roll thereto. End standards 14 are taller than central standards 16 whereby the outer rolls 10 and 10b are tipped so that a conveyor belt (not shown) placed upon the upper surface of the rolls will form a trough for transporting bulk material.

Referring to FIG. 2, roll 10 includes a generally cylindrical shell 22 having a recessed disc 24 at the end 26 which terminates in a central cup portion 28 extending within the shell and having an inclined, centrally open bottom 30. A number of tapered roller bearings 32 are secured to the surface 34 of fixed shaft 20 and are provided with an inner race 36 and an outer race 38. The outer race 38 joins with the inner surface of cup 28 whereby the latter cooperates with bearings 32 to rotatably support shell 22 on shaft 20.

An annular shield 40 is rigidly secured within cup 28 such as by press-fitting the same against the inner surface of the cup. Shield 40 is provided with a stepped inner surface presenting a pair of frusto-conical faces 42 and 44 disposed in spaced relationship to surface 34 of shaft 20, the latter being coaxial with shield 40.

A pair of rings 48 encircle shaft 20 inwardly of race 36 and have a disc-like, annular, flexible seal 50 secured therebetween at the inner periphery 52 of the seal. The outer periphery 54 of seal 50 engages the inner inclined surface of bottom 30 and is flexed thereby toward the proximal end 56 of shaft 20. The rings 48 fit sufficiently tightly on the shaft 20 to hold the seal 50 in place on the shaft 20.

An inner collar 58 circumscribes shaft 20 and abuts race 36 in opposed relationship to rings 48. An outer collar 60 circumscribes shaft 20 in spaced relationship to collar 58, there being a first outer seal 62 secured between the collars at the inner periphery of the seal and the outer periphery 64 thereof engages conical face 42 of shield 40. A second outer seal 66 is secured at its inner periphery to the outer edge of collar 60 with the outer periphery 68 engaging conical face 44 of shield 40. The annular seals 62 and 66 are formed from flexible material whereby the outer peripheries of wiping edges thereof flex toward end 56 of shaft 20 as a result of the engagement with respective conical faces 42 and 44.

Holding means in the form of a nut 70 is threadably secured to the end 56 of shaft 20, and the inner face of the nut engages seal 66 to maintain the bearing and seal arrangement in operating position. Nut 70 includes an annular portion 72 disposed in closely spaced, covering relationship to the adjacent outer surface of shield 40.

Similar holding means is provided at the other end of the shaft and suitable structure 73 is provided on standards 14 and 16 for interlocking the rolls to the respective standards whereby the shaft of each roll will be rigidly secured between corresponding standards. Nut 70a at the end of the shaft remote from end 56 is closed and is provided with a lubrication fitting 78. Nut 70, on the other hand, is provided with a recess 77 in the end thereof which may be utilized with a connector (not shown) for placing an axial bore 74 in shaft 20 in communication with a corresponding bore in the shaft of an adjacent roll.

A radial channel 80 communicates between bore 74 and surface 34 of shaft 20 and joins with annular passages 82 in collars 58 and 60. Collars 58 and 60 are provided with respective aligned ports or openings 84 whereby lubricant introduced through fitting 78 will subsequently pass through openings 84.

In operation, the open space between inner seal 50 and the proximal outer seal 62 forms a bearing reservoir 86, and the open space between the two axially spaced outer seals 62 and 66 forms an adjacent purging reservoir 88. Lubricant introduced through fitting 78 will pass into reservoirs 86 and 88, and upon filling of the same the lubricant will pass by periphery 68 of outer seal 66 into the open space 90 between shield 40 and annular portion 72 of nut 70.

Assuming that the detailed bearing and seal arrangement shown in FIG. 2 represents the upper end of roll 10 shown in FIG. 1, it will be appreciated that the recessed disc 24 inherently tends to collect foreign particles and water. With regard to material collecting on nut 70, the primary seal at this point is the close fit between annular portion 72 and shield 40 which would, of course, exclude large particles of foreign materials. Also, when fully lubricated, the space 90 between these surfaces would be filled with lubricant which would exclude all fine particles.

After prolonged rotation of shell 22 about rigid shaft 20, the lubricant in space 90 would likely be lost, whereupon fine foreign particles could eventually work into space 90 and under the outer periphery 68 of seal 66. However, even though the space 90 between portion 72 and shield 40 has become sufficiently dry to permit material to work under seal 66, the lubricant within purging reservoir 88 catches such material and tends to hold the same since the outward flexing of seal 62 tends to preclude the flow of lubricant into reservoir 86 from reservoir 88. This isolation of bearings 32 permits the present idler to be used for a much greater length of time before relubrication than has been the case with prior idler roll assemblies inasmuch as the present device is very successful in maintaining a clean lubricant supply in the bearing reservoir.

When the roll is re-lubricated, lubricant flows into reservoir 86 through the conduit means in the shaft, and inner seal 50 seats under the pressure to prevent any lubricant from going into the interior of the roll. Outer seal 62 will suitably flex away from face 42 to prevent overloading of bearings 32 and any excess lubricant will flow past periphery 62 into purging reservoir 88. Lubricant will also flow into reservoir 88 through outer collar 60, whereby lubricant is flowing into the purging reservoir 88 from two areas, to the end that the new lubricant forces the old lubricant past the periphery 68 of seal 66. The foreign material which has collected in reservoir 88 will be flushed out of the latter along with the old lubricant, and similarly, the foreign material which has collected in space 90 will be flushed and that area re-lubricated.

From the foregoing, it will be appreciated that the flexing of the wiping edges of each of the three seals toward end 56 plays a very important part in assuring optimum lubricant flow within the assembly, thereby assuring an abrasive-free bearing reservoir which, in turn, results in prolonged and efficient rotation of shell 22. The seating of the outer seal 66 against face 44 serves to block the entrance of foreign particles into reservoir 88 and to the extent that seal 66 is unsuccessful, seal 62 seats against face 42 to block further inward movement of particles. Thus, the natural flexing of seals 62 and 66, when foreign particles or lubricant tends to move inwardly, increases the efficiency of the sealing at the wiping edges of the seals. When lubricant is added to the reservoirs through shaft 20, the natural flexing movement of seals 62 and 66 is away from the corresponding faces 42 and 44, to the end that the lubricant flows outwardly from reservoirs 86 and 88 and thereby flushes away any foreign particles. Finally, inner seal 50 seats against bottom 30 of cup 28 to further promote outward flow of lubricant past seals 62 and 66, while additionally preventing loss of lubricant into the interior of shell 22.

It will be noted that roller bearings 32 are tapered so that when adjustment is required due to wear, it is merely necessary to tighten nut 70 or 70a which shifts the corresponding collars 58 and 60, inner race 36 and rings 48 inwardly whereby the bearing is adjusted and all three seals are simultaneously tightened at the wiping edges thereof.

The embodiment of the invention illustrated in FIGS. 4 and 5 is quite similar to that described with reference to FIGS. 2 and 3. Corresponding parts have been indicated by the prefix 1 associated with the numeral designations. The chief distinction between roll 10 and roll 110 resides in the shape of the shields. Shield 140 of roll 110 is provided with a pair of opposed, blade-like flingers 146 which extend radially outwardly from shield 140 exteriorly of disc 124. Flingers 146 are configured in substantially complemental relationship with the recessed configuration of disc 124. Flingers 146 serve to prevent the collection of water and foreign material at the outer ends of the rolls, particularly when the rolls are tilted as shown in FIG. 1. Rather than permit funneling of such materials into the seal chamber, it is thrown outwardly and away by the rotating flingers 146.

Nuts 170 and 170a of roll 110 are shaped slightly differently from nuts 70 and 70a. The annular covering portion 72 of nut 70 is omitted from the construction of FIG. 4 to provide adequate clearance for the rotation of flinger 146. Additionally, it is evident that a modified form of lubricant fitting 178 is illustrated in conjunction with nut 170a of roll 110. The configuration and disposition of the seals and seal surfaces are, however, identical.

Referring now to the form of the invention illustrated in FIGS. 6 and 7, the seal assemblies are quite similar to those heretofore described. However, the outer seal 262 is retained on shaft 220 by an annular collar 260 and a second annular collar 258. The latter is provided with a peripherally extending flange 259 presenting an annular shoulder 261 facing outwardly toward seal 262.

Shield 244 is configured to present an annular shoulder 245 disposed in outwardly and axially spaced offset relationship from and facing generally toward shoulder 261. A disc like washer 263 is slidingly received over collar 258 for rotational movement with respect thereto and also for limited axial shifting movement between the respective shoulders 261 and 245. Although the central opening of washer 263 is only slightly larger than the outer peripheral surface of the collar 258, the fit of washer 263 on collar 258 is sufficiently loose so that washer 263 may float on collar 258 and within the limits of the respective shoulders 261 and 245 as shell 222 and shield 244 are rotated with respect to the stationary shaft 220 and the stationary collars 258 and 260.

An innermost seal 250 clamped between rings 248 on shaft 220 defines the inner end of the bearing reservoir between seals 250 and 262. Thus, washer 263 is located within the bearing reservoir on the outboard side of bearing means 238. Shaft 220 and the ring 248 proximal bearing means 238 are provided with aligned, radially extending apertures 280 to permit the flow of lubricant from the shaft bore 274 into the bearing reservoir as lubricant is forced into bore 274 by means of a fitting (not shown) at the outermost end of nut 270. The lubricant entering the bearing reservoir exerts a force against washer 263 to cause the outermost flat side thereof to sealingly engage the proximal flat shoulder 245 of shield 244. Thus, the lubricant is retained within the bearing reservoir as the lubricant is forced through bore 274 under sufficient pressure to transfer the lubricant axially of shaft 220 for lubricating the other bearings of the assembly. It will be noted from FIG. 7 that all of the bearings are constructed in a substantially identical manner and each is provided with a floating washer 263. This permits sufficient pressure buildup for forcing the lubricant axially of shaft 220 and radially through aperture 280 for successively lubricating all of the bearings of the assembly.

It should be noted that a short length of flexible tubing 290 is received within the corresponding proximal opposed ends of the shafts 220 of adjacent roll assemblies whereby the bores 274 of the shafts are in fluid communication. Thus, it is possible to lubricate all of the bearings of the rolls 210 from one end of an assembly while the same are mounted in operative position as illustrated generally in FIG. 6. The use of conduit 290 which is formed of flexible material permits bending of the conduit to the angle of the shafts and facilitates installation of the means for fluid communication between the shafts.

Although the washers 263 serve to seal the bearing reservoir against the major thrust of the lubricant which is admitted into the reservoir under pressure, the ability of the washer to rotate with respect to collar 258 as the shell 222 rotates and also the ability of the washer 263 to shift axially between shoulders 245 and 261 during rotation insures that a limited amount of lubricant may work past the washers during lubrication and operation of the assembly. This provides for an ample flow of lubricant in the direction of the purging reservoirs between outer seals 262 and 266 to purge the assembly of foreign matter.

A further advantage of the use of washers 263 which are neither rigidly secured to the rotating members nor the stationary members of the assembly is that neither the washers nor those parts within which they come in contact need be carefully machined to close tolerances during fabrication. On the contrary, the floating relationship of the washers 263 within the respective assemblies accommodate for minor imperfections during fabrication yet permit the washers to seal against the main thrust of the pressurized lubricant with a limited by-pass of a sufficient supply of lubricant for purging the assembly. If the washers were to be fixed rigidly to either the corresponding rotating shields 244 or to the fixed mounting collars 258, it will be readily recognized that the surfaces between the rotating and non-rotating parts would have to be carefully machined prior to assembly in order to achieve the foregoing objectives. This would not only raise the cost of the assembly but would also present maintenance problems which are not encountered with the novel arrangement of the embodiment illustrated in FIGS. 6 and 7.

Having thus described the invention, what is claimed as new and desired to be secured by Letters Patent is:

1. In a rigid idler:
   a fixed shaft;
   bearing means secured to the surface of said shaft;
   a generally cylindrical shell;
   means mounting the shell on the bearing means for rotation about the shaft, including a disc adjacent an end of the shell having a central cup portion extending within the shell away from said end thereof and cooperating with said bearing means for rotatably supporting said shell on the shaft;
   an annular shield rigidly secured to said disc and presenting an inner surface spaced from the surface of the shaft and coaxial with the latter;
   a pair of axially spaced, flexible, annular disc-like outer seals circumscribing said shaft between the bearing means and the proximal end of the shaft;
   each outer seal presenting inner and outer peripheries and having means securing one periphery thereof to one of said surfaces, the other periphery of each seal being in wiping engagement with the corresponding opposed surface and flexed toward said end of the shaft, thereby defining a purging reservoir between the outer seals;
   a third annular seal circumscribing said shaft interiorly of said bearing means and having means securing the same in sealing relationship between the surfaces of the shaft and of said cup portion thereby defining a bearing reservoir between said third seal and the proximal outer seal; and
   conduit means including a bore in the shaft having a pair of ports communicating with said bearing and purging reservoirs for delivering lubricant thereto.

2. The invention of claim 1, there being locking structure coupled to said end and having an annular portion in closely spaced relationship to said inner surface of the shield, and a flinger extending radially outwardly from said shield exteriorly of the disc.

3. The invention of claim 1, wherein is provided means for permitting restricted flow of lubricant including a disc shaped washer disposed around the shaft for rotation and axial shifting movement with respect thereto, said shield including an annular shoulder disposed to be engaged by the flat side of said washer to limit said axial shifting movement toward the outer end of the shaft and to seal against passage of lubricant between said washer and the shield.

4. The invention of claim 1, wherein said shield is provided with an inwardly facing shoulder in said bearing reservoir,
   a collar rigidly mounted on the shaft, said collar having an outwardly facing, annular shoulder spaced longitudinally of the shaft from the shoulder of the shield, and
   a washer disposed over the collar and between said shoulders, said washer being shiftable and rotatable with respect to the collar to permit passage of lubricant from the bearing reservoir to the purging reservoir.

5. The invention of claim 1, said inner surface of said shield having a spaced pair of annular zones inclined outwardly in the direction of said proximal end of the shaft, said inner surface of said cup portion of said shell having an annular zone inclined outwardly in the direction of said proximal end of the shaft, said outer and inner seals each being secured at its inner periphery to said shaft, the outer periphery of the outer seals each being engaged with a corresponding one of said zones on said shield, the outer periphery of the inner seal being engaged with said zone on said cup portion and flexed toward said proximal end of the shaft.

References Cited

UNITED STATES PATENTS

| | | | |
|---|---|---|---|
| 3,239,284 | 3/1966 | Cina et al. | 308—20 |
| 3,345,115 | 10/1967 | Olender | 308—20 |
| 3,420,590 | 1/1969 | Bilocq | 308—187 |

MARTIN P. SCHWADRON, Primary Examiner

FRANK SUSKO, Assistant Examiner